United States Patent
Morovic et al.

(10) Patent No.: US 9,674,403 B2
(45) Date of Patent: Jun. 6, 2017

(54) CREATING A COLOR GAMUT LOOK-UP-TABLE

(71) Applicant: Hewlett-Packard Development Company, L.P., Houston, TX (US)

(72) Inventors: Peter Morovic, Sant Cugat del Valles (ES); Jordi Arnabat Benedicto, L'Arboc del Penedes (ES); Jan Morovic, Colchester (GB); Jordi Vilar Benito, Castelldefels (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/294,622

(22) Filed: Oct. 14, 2016

(65) Prior Publication Data
US 2017/0041506 A1    Feb. 9, 2017

Related U.S. Application Data

(63) Continuation of application No. 14/780,736, filed as application No. PCT/EP2013/072735 on Oct. 30, (Continued)

(51) Int. Cl.
| | | |
|---|---|---|
| H04N 1/60 | (2006.01) | |
| H04N 1/407 | (2006.01) | |
| H04N 1/40 | (2006.01) | |

(52) U.S. Cl.
CPC ........... *H04N 1/6019* (2013.01); *H04N 1/605* (2013.01); *H04N 1/6008* (2013.01); *H04N 1/6058* (2013.01); *H04N 2201/0082* (2013.01)

(58) Field of Classification Search
CPC .. H04N 1/605; H04N 1/6025; H04N 1/00954; H04N 1/4072; H04N 1/6058;
(Continued)

(56) References Cited

U.S. PATENT DOCUMENTS

| | | |
|---|---|---|
| 7,710,597 B2 | 5/2010 | Edge |
| 8,335,015 B2 | 12/2012 | Klassen et al. |

(Continued)

FOREIGN PATENT DOCUMENTS

JP    2009164709    7/2009

OTHER PUBLICATIONS

Chen Y et al. "Six color printer characterization using an optimized cellular Yule-Nielsen spectral Neugebauer model". Journal of Imaging Science and Technology, SPIE—The International Society for Optical Engineering, US, vol. 48, No. 6, Dec. 1, 2004.
(Continued)

*Primary Examiner* — Quang N Vo
(74) *Attorney, Agent, or Firm* — Michael A. Dryja (57) ABSTRACT

A color look-up-table (LUT) is created for use by an imaging system which uses a resource to display an image and/or provides an attribute of the image. A method of creating the LUT, comprises selecting a threshold value of resource usage and/or metric of the attribute. A predetermined color look-up-table representing a mapping from color values of a first color gamut to color values displayable by the imaging system is accessed. The predetermined color look-up-table has nodes defining colors to be displayed for the said color values. Resource usage and/or attribute values associated with the said nodes are compared with the threshold value thereby determining the set of nodes of the predetermined gamut having a resource usage and/or attribute values less than the threshold value. A new look-up-table is created which maps the said predetermined color gamut look-up-table to the said set of nodes.

20 Claims, 4 Drawing Sheets

Related U.S. Application Data 2013, now Pat. No. 9,501,727, which is a continuation of application No. PCT/EP2013/058329, filed on Apr. 22, 2013.

(58) Field of Classification Search
CPC .............. H04N 2201/0082; G06T 5/00; G06T 2207/10024; G06T 2207/30176
See application file for complete search history.

(56) References Cited

U.S. PATENT DOCUMENTS

| | | | |
|---|---|---|---|
| 8,395,831 | B2 | 3/2013 | Qiao |
| 2005/0062992 | A1* | 3/2005 | Kishimoto ........... H04N 1/6058 358/1.9 |
| 2009/0185200 | A1 | 7/2009 | Tin |
| 2009/0237757 | A1 | 9/2009 | Sawada et al. |
| 2010/0134550 | A1 | 6/2010 | Ito et al. |
| 2011/0063632 | A1* | 3/2011 | Klassen ................ H04N 1/54 358/1.9 |
| 2011/0069334 | A1 | 3/2011 | Hoshii et al. |
| 2011/0096344 | A1 | 4/2011 | Morovic et al. |
| 2012/0043751 | A1 | 2/2012 | Hersch et al. |
| 2012/0113440 | A1 | 5/2012 | Gil et al. |
| 2012/0147392 | A1 | 6/2012 | Imai |
| 2012/0162239 | A1 | 6/2012 | Marcu et al. |

OTHER PUBLICATIONS

International Search Report, Jan. 14, 2014, PCT Patent Application No. PCT/EP2013/058329, 4 pages.
International Search Report, Jan. 30, 2014, PCT Patent Application No. PCT/EP2013/072735, 4 pages.
Jeremie Gerdardt et al: "Controlling the error in spectra vector error diffusion", Proceedings of SPIE, vol. 6493, Jan. 28, 2007, p. 649316.
McElvain, J. et al., Spectral Printer Modeling for Transparency Media: Toward High Dynamic Range Scene Reproduction, (Research Paper), Jan. 19, 2009.
Morovic J et al: "HANS: Controlling Ink-Jet Print Attributes Via Neugebauer Primary Area Coverages", IEEE Transactions on Image Processing, IEEE Service Center, Piscataway, NJ, US, vol. 21, No. 2, Feb. 1, 2012, pp. 688-696.
Stone, M.C. et al, Color Gamut Mapping and the Printing of Digital Color Images, Oct. 1988, pp. 242-292, vol. 7, No. 4.
Wyble, D.R. et al., A Critical Review of Spectral Models Applied to Binary Color Printing, (Research Paper), Feb. 2000, pp. 4-19, vol. 25, No. 1.

* cited by examiner

CREATING A COLOR GAMUT LOOK-UP-TABLE

BACKGROUND

Traditional printing uses a colorimetric approach to visually match a printed color to a color of source content. Colorimetry approximates human color perception by representing observed colors by their tristimulus values—one for each of the three types of light sensitive cells (cones) lining the retina at the back of the human eye. One type of cone cell is sensitive mostly to long wavelengths (L), another to medium wavelengths (M) and yet another to short wavelengths (S) of electromagnetic radiation in the visible range (i.e., from approximately 400 to 700 nm). Mostly for historical reasons, colorimetry uses a linear transformation of the LMS space, derived from psychophysical color matching experiments, called XYZ, defined by the CIE (Commission Internationale de l'Eclairage). The tristimulus values of X, Y and Z of a colorimetric approach form the basis of approximately representing all colors seen by a human visual system. Colors are thus identified based on co-ordinates in this CIE XYZ space.

Colorimetric reproduction, for example using the CIE XYZ color space, is generally limited to a set of viewing conditions such as a standard observer and a single illuminant. A standard observer is one that represents the average human's response to light falling on the receptors of the eye. Illumination conditions may change depending on the time of day for which observation is taking place, for example sunset gives rise to an illuminant of lower Correlated Color Temperature (CCT) falling on objects as opposed to an illuminant of higher CCT at midday. Therefore, a surface viewed under one illuminant will not give the same observed color when viewed under a second illuminant. Both the standard observer and illuminant are considerations for color reproduction and for performing visual matching. Traditionally, the standard observer and standard illuminant (e.g. D50) are used to visually match colors observed between an original and a reproduction. However, when the observer or the illumination conditions are changed, the reproduction may no longer be accurate and appear different to the original.

A gamut provides a representation of available colors in a color space, for example a CIE color space. The output of an imaging system, for example a printer, display device or projector, is judged in terms of its attributes such as smoothness, noise or grain, color constancy under different viewing conditions and the use of resources, such as ink for printers and power for projectors and display devices, for delivering that output. For many attributes the performance of the imaging system is worse in some parts of the color gamut than in others. In for example a printing system, colors are represented by a combination of inks of different colors deposited on a substrate and it is desirable to limit the amount of ink used to represent a color.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details are set forth in order to provide a thorough understanding of the present apparatus and method. It will be apparent, however, to one skilled in the art that the present apparatus and methods may be practiced without these specific details. Reference in the specification to "an example" or similar language means that a particular feature, structure, or characteristic described in connection with the example is included in at least that one example, but not necessarily in other examples.

An example of the present disclosure will be described firstly with reference to a printing system in which the usage of ink is controlled. However as will be described herein below the disclosure is not limited to only controlling ink usage in a printing system and nor is the disclosure limited to printing systems. The present disclosure may be applied to any suitable imaging system.

Figure 1:
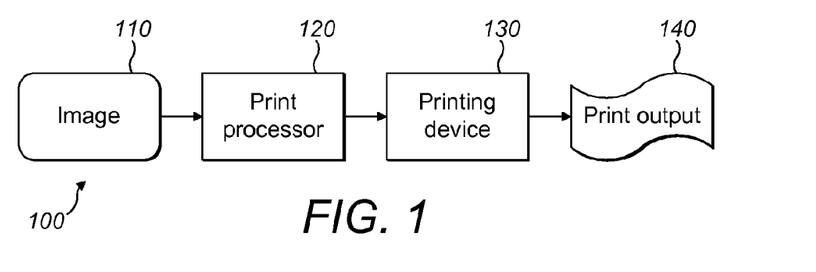
FIG. 1 is a schematic illustration showing a printing system for producing a print output.

FIG. 1 shows an example of a printing system 100 that may be used with the methods described herein. The printing system 100 produces a print output. The print output comprises colored inks deposited on a substrate which may be paper, fabric, plastic or any other suitable print medium. In the example of FIG. 1, image data corresponding to an image 110 is sent to a print processor 120. The print processor 120 processes the image data. The print processor then outputs print control data that is communicated to a printing device 130. The printing device generates a print output 140 as instructed by the print control data. Certain examples described herein may be used with inkjet and other types of printer for example Hewlett Packard's Designjet printers. Certain examples may also be used with Liquid Electrophotographic (LEP) printers, such as the Indigo range of printers supplied by Hewlett Packard Company of Palo Alto, Calif. The examples described herein apply to substrate printing fluids containing color pigments. However, in addition, other printing fluids may be used to alter the appearance of a printed output without color pigmentation, e.g. through the application of gloss or the like.

Examples of the disclosure described herein may print an image using a half-tone process.

In examples of the disclosure described herein, the primary inks available to a printing device (i.e. the printable inks) are, cyan, magenta and yellow (CMY) and may additionally include black (K). For example, in an ink jet implementation, ink may be supplied from one or more ink cartridges and deposited onto a print medium through the use of one or more nozzle actuators. The print control data may instruct which nozzles in a print head should fire in order to deposit one or more drops of ink at each pixel in the image.

Figure 2:
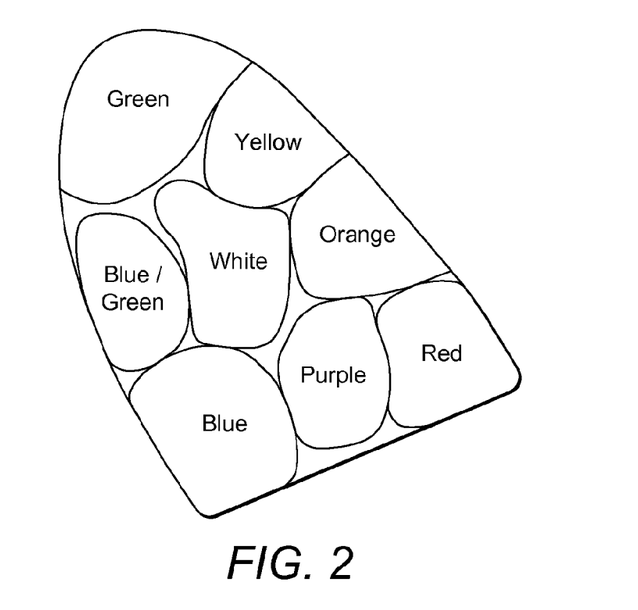
FIG. 2 is a chromaticity diagram indicating color names.

In one implementation, a gamut provides a representation of available colors in a color space, for example the CIE XYZ color space. FIG. 2 is a simplified CIE xy chromaticity diagram. It schematically indicates zones containing color names, for example red, green, blue etc. The zones indicate colors of the gamut perceived by a viewer to be a color of that name. It will be appreciated that the gamut of colors is in fact continuous and not limited to such zones. The division of the continuous gamut into discrete regions of color is chosen based on the standard observer's perception of each color region as described above for CIE XYZ.

Changes in illumination conditions cause effects such as metamerism and color inconstancy. Metamerism manifests when both an original (e.g. a painting) and its reproduction are viewed under different illumination conditions. In this case surfaces that matched under reference illumination conditions may no longer match. This leads to a degradation of the accuracy of the reproduction. Instead, color inconstancy manifests when colors in a reproduction appear to change when viewed under different illumination conditions. A reflectance may refer to the proportion of light that is reflected from an object or may provide a spectrum indicating reflectance values for a range of wavelengths. The wavelengths may be predominantly in the visible or optical range of wavelengths, i.e. approximately 300-700 nanometers. A reflectance may be measured independently of light source.

The effect of metamerism is observed because there may be more than one combination of light and surface reflectance (known as a color signal) that jointly results in equivalent receptor responses in the human eye. To match an apparent color, the origin of which is a given reflectance, an alternative reflectance (i.e. a metamer) can be used which has different spectral characteristics under the same illumination conditions. Therefore, under a given illuminant and for a given observer, a visual color matching between an original and reproduction can be achieved but this is still dependent on the underlying reflectances of the colors in the printed reproduction and the original. Metamerism is the existence of a multitude of combinations of reflectance properties that result in the same perceived color, as for a fixed illuminant and observer. However, when the illumination conditions and/or observer are changed, the metamer and apparent color may no longer be observed as the same and the perceived colors no longer match.

Grain is a psycho-visual attribute that is the consequence of local color contrast of an observed pattern and its effect on the human visual system. It can be predicted for example by means of processing a halftoned patch of a given ink combination (or Neugebauer Primary area coverage (NPac) in the example of a Halftone Area Neugebauer Separation (HANS) pipeline case) through a model of human color vision, including its contrast sensitivity characteristics, and subsequently computing per-pixel-window color differences. These in turn define a color difference distribution over the patch and its statistics can determine the attribute of grain.

Examples described herein use combinations of primary inks known as the Neugebauer Primaries (NPs). An example of a print system that uses NPs in image processing is a HANS printing pipeline. HANS is an image processing system using NPs, NPacs and halftoning. For a binary (bi-level) printer, an NP is one of $2^k$ combinations of k inks within the printing system, wherein inks can be represented in single-drop states, in a k-dimensional color space. For example, if a printing device uses CMY inks there can be eight NPs, these NPs relate to the following: C, M, Y, C+M overprinting (or blue), C+Y overprinting (or green), M+Y overprinting (or red), C+M+Y overprinting (or black), and W (or white or blank indicating an absence of ink). As is clear, a printing device with many primary inks and many ink-drop states can have more NPs available than a printing device having a few primary inks and having bi-level states.

Distributions of NPs over a unit area are referred to as Neugebauer Primary area coverages or NPacs. NPacs serve as the input for the halftoning procedure. This may be seen as selecting one of the NPs at every halftone pixel. It should be noted that there is a multitude of NPacs that correspond to any one ink-vector as used by comparative printing systems. Each of these NPacs however has a different combination of reflectance and colorimetry and therefore gives access to a much larger variety of colors or larger printable gamut. On the other hand, multiple NPacs may have the same colorimetry (being that colorimetry's metamers) while differing in spectral reflectance. There may also be multiple NPacs with the same colorimetry and/or reflectance but with different use of the available NPs. This will be described in more detail with reference to FIGS. 6A and 6B.

A print system that uses NPacs in image processing is a Halftone Area Neugebauer Separation (HANS) printing pipeline. NPacs are specific to HANS. HANS is an image processing system using NPs and NP area coverages (NPacs) and halftoning that may be optimized for a desired ink usage, grain or other print attributes such as smoothness, noise, grain or color constancy. (It should be appreciated that the disclosure may be used with other printing systems.)

A look-up-table (LUT) is used to determine, for each pixel of the input image data, the NPac which is defined by the set of NPs (inks and their overprints) and their corresponding area coverages. The LUT thus provides data about ink usage.

In the process of building a LUT, many metamers are evaluated that may match a given color and then one of the available metamers is chosen. The most suitable metamer may be chosen according to constraints on a particular attribute. Once the constrained LUT is computed, each node may contain a single NPac.

Figure 3:
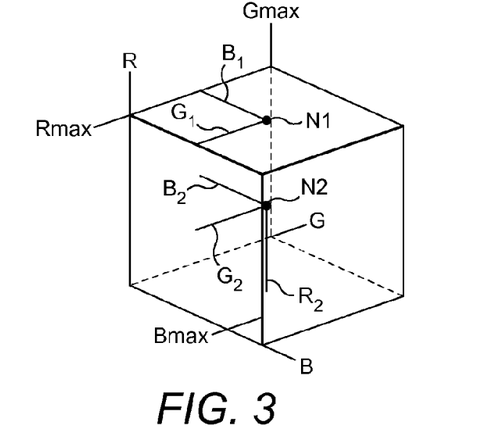
FIG. 3 is a diagram of a three dimensional, RGB, look-up-table.

FIG. 3 is a diagram of an LUT. The LUT shown has the form of a cube and is indexed in a device color space such as RGB in this example. The table has nodes each of which contains data defining an NPac to be used to reproduce a particular color having co-ordinates R, G, B. For any node indexed by RGB, the node contains an NPac that when halftoned over a unit area results in a colorimetry (XYZ) that is chosen to map to the device color RGB.

FIG. 3 shows by way of example a surface node N1 having coordinates Rmax, G1, B1 and an interior node N2 having coordinates R2, G2, B2. The nodes at the surface may be regarded as being in a layer at the surface. Successive layers of nodes lie below the surface. Thus, the LUT provides a discrete, non-continuous, representation of the colors to be printed. This example relates to RGB color to be printed using CMY inks. However, some printing systems may operate based on four or more colors, for example C, M, Y and K, where K is black. In this case this printing system would use an n-dimensional LUT, where n is four or more.

A LUT could be either 3D RGB or 4D CMYK (or more dimensions) for example, with the node complexity changing as a function of the number of NPs. For example, a CMY bi-level set-up would have nodes with up to eight NPs and their respective area coverages (i.e. NPacs that can have up to eight NPs and proportions), while a three-level (0, 1, 2 drop) CMYK system may have up to eighty-one NPs and their respective area coverages.

Certain examples of the disclosure will now be described in more detail.

The output of an imaging system, for example a printer, display device or projector, may be judged in terms of its attributes such as smoothness, noise or grain, color constancy under different viewing conditions and the use of resources such as ink for printers and power for projectors and display devices. For many attributes, the performance of the imaging system is worse in some parts of the color gamut than in others. For example, there may be little or no redundancy of colors at the gamut surface. A color gamut of an imaging system depends on an LUT such as described in FIG. 3. For an unmodified (initial) LUT the output of the imaging system is, at least whatever the system delivers by default. The examples of the disclosure first identify those parts of an initial color gamut of the imaging system which comply with a desired value of resource usage and/or quality of attribute, secondly restrict the gamut to parts which comply, and then gamut map from the initial gamut to the restricted gamut. The result is a gamut complying with the desired properties but with loss of some of the initial gamut. The method is based on the observation that the attributes and resource usage vary within the available gamut.

Figure 4:
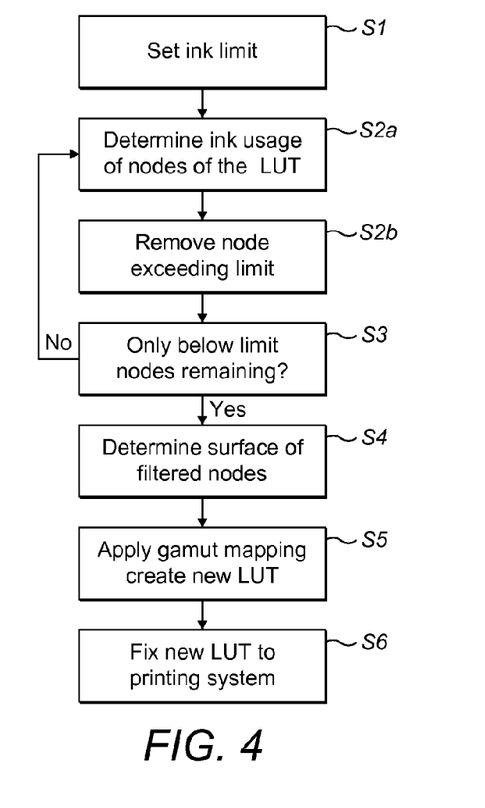
FIG. 4 is a flow chart of an illustrative method in accordance with the disclosure of constraining a color gamut.

In the example of FIG. 4, gamut mapping and gamut constraining are performed so that ink usage may be controlled. (However, the disclosure is not limited to controlling ink usage). The ink usage is traded-off against the color gamut which is printed on a substrate, with the result that color fidelity may be reduced. This example aims to maintain approximate colors. For example green in the original image data is rendered as green in the printed image, and may be achieved by approximating the original green. The trade-off may limit the gamut in a controlled and targeted manner.

The method of FIG. 4 is implemented by a computer program run in a computer. The computer may be separate from the printing system of FIG. 1 or could be the print processor 120 of FIG. 1. The computation can be performed by a host software solution such as a Raster Image Processor (RIP) software package. In this way a customer may generate a new LUT off-line using an RIP software package. The method is performed independently of actual data representing an image to be printed.

At block S1, an ink limit is selected manually by an operator. The ink limit in this example is the total amount of ink used by an NPac. For example it is the total amount of ink in an NPac computed as the individual contributions of C, M and Y present in the NPs, and weighted by their respective area coverages. The ink limit may be chosen based on the type of substrate to be used. The ink limit may be chosen based on an experimental print. The ink limit may also be chosen based on a cost trade-off, automatically or by a printer operator.

Blocks S2a, S2b and 3 of the method remove all nodes of the LUT which have an ink usage greater than the limit. In this example, ink-usage is the chosen constraint. Each node of the unconstrained LUT may contain more than one NPac (relating to available metamers). However, a constrained LUT may have one NPac per node in which one metamer is selected based on constraints.

Blocks S2a and S2b, access the LUT (see FIG. 3) which defines mapping from RGB (or CMYK) to the NPacs of the HANS system (or color-vectors the case of a non-HANS printing pipeline). Starting at the surface layer, the ink usage of each node is determined, S2a, and compared with the selected ink limit. If the usage exceeds the limit, the node is removed, S2b, from the LUT. The blocks S2a and S2b are repeated for successive layers towards the interior of the LUT until all nodes have been visited and evaluated. The result may be incomplete layers from which one or more but not all nodes have been removed. Layers may not be removed entirely but instead nodes are removed on a per-node basis. It is computationally efficient to process nodes layer by layer starting at the surface layer and working towards the interior of the LUT. Equally, all the nodes may be visited sequentially.

In an alternative example, Blocks S2a, S2b and 3 are replaced by blocks which remove all nodes of the LUT which have an ink usage greater than the limit.

The LUT may have a set of two or more metamer NPacs per node, each with different levels of ink use, instead of a single output NPac per node and the blocks S2a, S2b and 3 may select at a node the metamer NPac(s) having an ink usage less than or equal to the limit. If ink usage equal to the ink limit is desired, it can be achieved by linearly interpolating between the pair of NPacs from among the list stored for a given node that are closest above and below the desired ink limit. The selection of a single NPac for a metamer is described later with reference to FIGS. 6A and 6B.

Turning to FIG. 4, the result of blocks S2a, S2b and 3 is a LUT with all nodes having an ink usage exceeding the limit removed. The missing nodes may then need to be replaced with a suitable node complying with the ink limits. This is done in blocks S4 and S5.

Blocks S4 and S5 compute a new LUT for use by the printing system, the new LUT being complete in that for every value RGB of input data there is a corresponding node; (i.e. in effect, the removed nodes are replaced) and the new LUT contains nodes with an ink usage less than or equal to the ink limit. Each node of the new LUT contains a single NPac. Blocks S4 and S5 are needed because the result of blocks S2a, S2b and S3 is an incomplete LUT, i.e. one that does not specify outputs for all input RGB values. Essentially, this is a two-step process for each RGB LUT node: 1) gamut map the RGB's original color to the gamut of the filtered LUT, and 2) interpolate the mapped color in the filtered LUT. In this way, all RGBs have an output that is constrained to the filtered LUT, but that is specified for all RGBs.

There may be various implementations for performing blocks S4 and S5.

For a first example of a HANS system, block S4 can assume that the set of nodes of the original full LUT is a convex set and that the filtered LUT can be assumed to be a convex set. The gamut of the remaining nodes is obtained as their convex hull and the whole original LUT is first gamut mapped and then interpolated through a tessellation of the nodes that have remained after filtering. Interior nodes that were removed are replaced by convex combinations of their neighbours. In one example if one node is just above the limit and its neighbour is just below the limit, a new node is computed as a convex combination of the two.

In a second example, starting from the original full LUT, nodes are removed by blocks S2 and S3. Block S4 computes the convex hull of the remaining nodes. Nodes that have been removed are mapped onto the nearest point on the hull of the remaining nodes. The surface of the filtered nodes, i.e. the LUT produced by blocks S2 and S3, is determined by replacing each removed surface node by the nearest remaining surface node and using the tessellation of the surface of the original LUT. Some of the original LUT's surface triangles may end up being projected onto single points of edges of the convex hull; such triangles are removed because they are redundant.

Block S5 in both of the two examples described above applies gamut mapping between the original unfiltered LUT and the filtered LUT produced by blocks S2 to S4. This is the gamut restriction LUT that achieves the desired ink usage. In an example of a non-HANS printing pipeline color-vectors may be used for gamut mapping.

Figure 5:
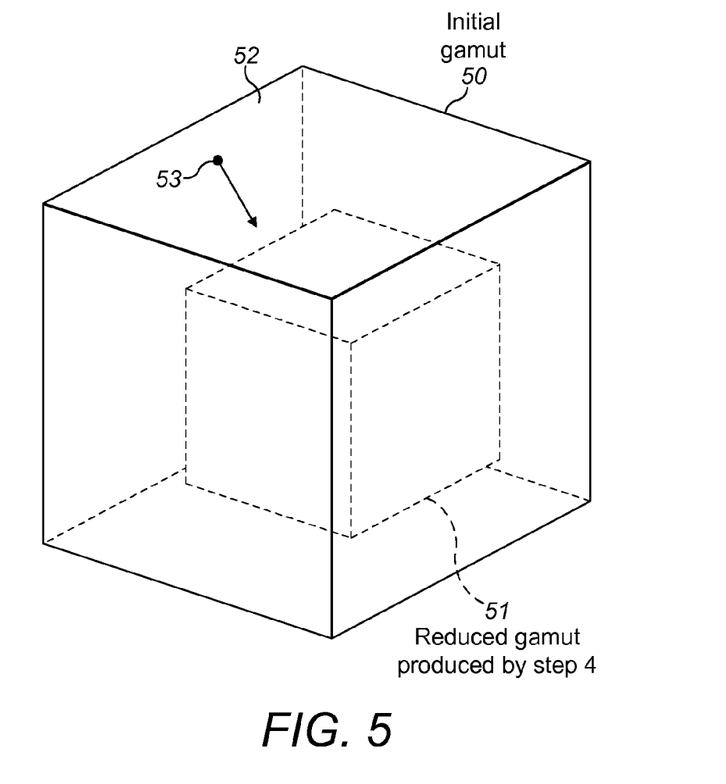
FIG. 5 is a simplified illustration of an initial gamut and a constrained gamut produced by the method of FIG. 4 from the initial gamut.

Referring to FIG. 5, the initial gamut 50 and the reduced gamut produced by blocks S2, S3 and S4 of the method are shown. In one implementation, a mapping of the points may be provided on the initial gamut for example points 52 and 53 onto points within the reduced gamut 51 to ensure that all input data is represented, if approximately, in the printed image.

Figure 6A:
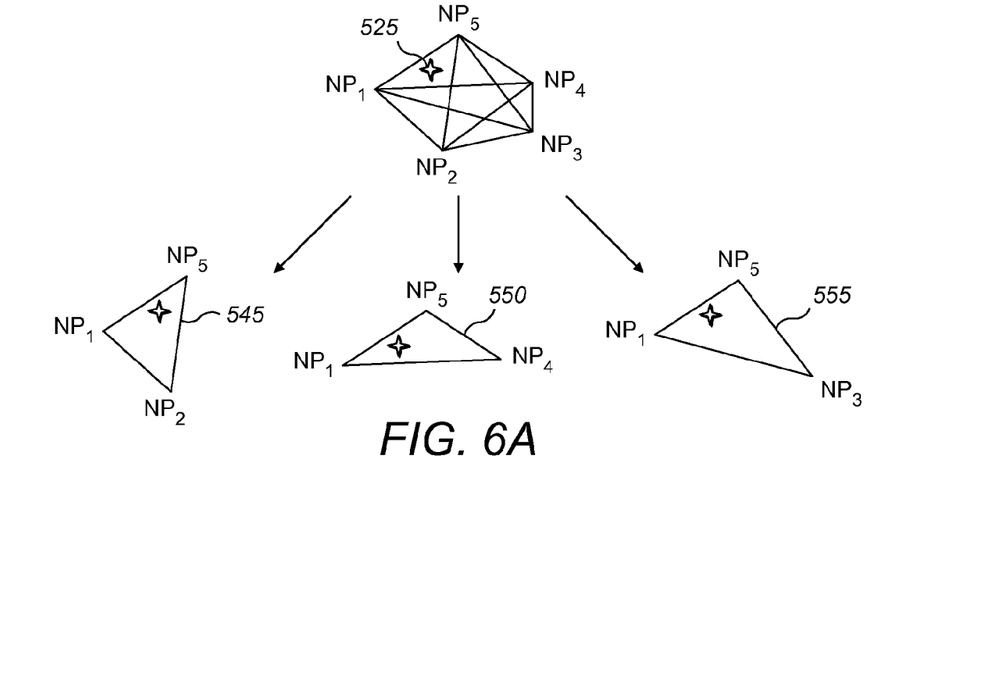
FIG. 6A is a schematic illustration showing a method for selecting a metamer for inclusion in a constrained look-up-table according to an example.

FIG. 6A shows an example selection of a metamer for inclusion in a constrained LUT. There may be more than one combination of NPs available for producing the same color 525. This applies where a redundancy exists. For example, the metamers 545, 550 and 555 are provided for the same color 525. The color 525 may be formed using the inks $NP_1$ and $NP_5$ in combination with either $NP_2$, $NP_3$ or $NP_4$. However, a constraint on the ink-usage attribute may be desired for one of the inks $NP_2$, $NP_3$ or $NP_4$, in which case one of the metamers may be ruled out and excluded from the constrained LUT.

Figure 6B:
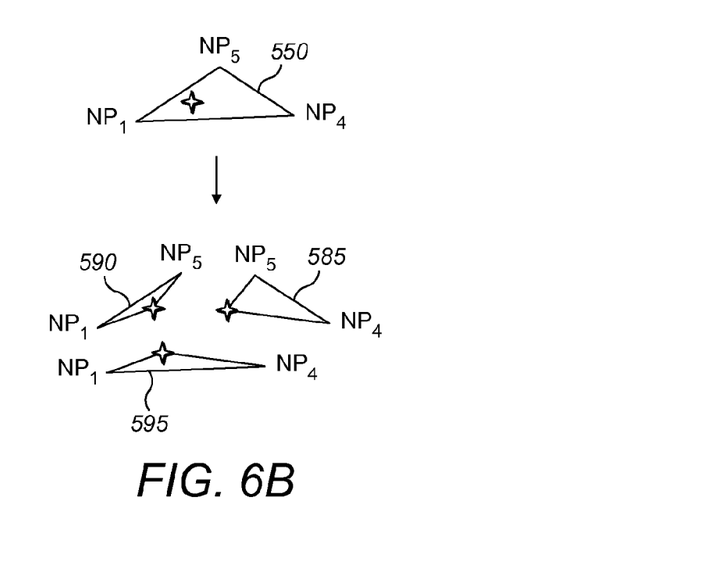
FIG. 6B is a schematic illustration showing a method for printing a metamer using Neugebauer Primary area coverages.

In the example of FIG. 6B, the ink $NP_4$ has no ink-usage constraint and the metamer 550 is selected. Metamers 545 and 555 are excluded from the constrained LUT. The selected metamer may be printed using a different volume or amount of each NP in which the area coverage of each NP is known. The area coverage for each NP may be determined through mapping of weights from barycentric co-ordinates corresponding to the NPacs 585, 590, 595. The resulting combination of the NPacs 585, 590 and 595 correspond to the chosen color 525 of FIG. 6A. Once the new LUT is computed, each node contains a single NPac.

The method for preserving color names will now be described. In one implementation, the mapping of the initial gamut to the reduced gamut preserves color names. This may be achieved by categorizing node colors in the initial gamut according to color name categories and mapping the out-of-gamut nodes of the initial gamut to the reduced gamut's color-name categorized nodes according to their respective color name categories. Secondary constraints may be introduced such as a 'green' being mapped to the closest 'green' in CIE DE2000 terms, or to a 'green' that has as similar saturation to the source color as possible etc.

Some colors may be protected from removal. Blocks 2 and 3 may be subject to a further constraint such as protecting certain colors from removal. Examples of colors which may be protected include (without limitation) corporate identity colors and colors to a palette used by a CAD application. This constraint simply overrides the target ink usage cut-off in the process of filtering the LUT's nodes by not allowing their removal from the original LUT and means that some parts of the color gamut will be disproportionate to others, both in terms of exceeding ink usage and in terms of color gamut.

Other attributes may also be controlled. The foregoing description refers to controlling ink usage in a printing system. However the disclosure may be applied to controlling attributes of a printed image, such as grain and color constancy. The blocks S2a, S2b and 3 may be carried out on the basis of a metric representing an attribute such as noise, grain or color constancy. The threshold value of the metric may be determined by printing a test image and measuring the attribute to be controlled, or by computing it directly as is the case in the examples of ink usage.

In one implementation, one or more attributes and resources may be controlled. A combination of attributes and/or of one or more attributes and one or more resources may be controlled at the same time. As set out above, the method starts with an initial gamut represented by a full LUT. The full LUT stores the result of applying different metrics to each of its nodes. A user can then set multiple constraints and the nodes that simultaneously satisfy them all are identified and a constrained LUT is built to map to them. In an example of the disclosure, the full LUT containing the metrics is built off-line, e.g. independently of the printing system, instead of having to be computed when the filtered LUT is produced. The filtered LUT is produced from the full LUT by the process of FIG. 4 by applying a combination of desired constraints.

Thresholds may be set for each respective attribute or attributes and/or resources to be controlled. This defines different constraints which may be applied to the full LUT to produce a new LUT that satisfies a combined constraint set of the chosen metrics. For example the metrics or attributes may include not exceeding ink-usage of X drops per color while not exceeding a grain metric of Y. In one implementation, a pre-existing (computed, predicted or measured) full LUT may have each node has associated with a series of metric values and the computation of different LUTs satisfying different cut-off values for one or more attributes can be achieved. This allows, for example, the cut-off and metric choices to be made by a print operator or even a final customer with the overhead of computing a new LUT that satisfies said the chosen cut-off value(s) being computationally small and not requiring a reprinting nor re-measuring of any data. Thus, a single, full LUT computed off-line by a printer manufacturer can serve as a super-LUT that is used to compute any number of constrained LUTs. The computation can be performed in the print processor or by a host software solution such as a Raster Image Processor.

The examples described herein provide the advantage of the ability to optimise the gamut of an imaging system in a controlled and targeted manner. Therefore the output of the imaging system is no longer constrained by "natural" properties at the gamut boundary where there may be little or no color redundancy which could be used for optimisation. The present disclosure provides a means of reducing a gamut for further benefits than are possible with existing imaging systems' natural color gamut.

Examples described herein advantageously provide a gamut limitation according to attributes instead of techniques that may involve the restriction of an imaging system's primaries. The present examples described enable a method for limiting a gamut whilst keeping desired regions of the gamut. For example, in some implementations, the gamut may not be restricted in many interior regions of the gamut (which may for example otherwise be restricted by reducing the primaries of the imaging system). The present disclosure provides a wider gamut available according to one or more attribute constraints by removing parts of the gamut that do not meet desired constraints (as opposed to removing broad regions of the gamut that may otherwise still meet constraints). The color gamut is limited to reach a desired level of one or metrics or attributes. The removal of parts of the gamut to meet the constraints leads to a greater output quality than would otherwise be possible under the set of constraints.

The disclosure described herein may be used in conjunction with existing optimisation of resource approaches. The disclosure provides improved performances in terms of a chosen attribute or attributes by limiting the gamut in a controlled and targeted way.

Examples of the disclosure are described above with reference to a HANS printing system. However, the disclosure is also applicable to non-HANS printing pipelines. Typically printing pipelines involve the choice of a combination of colorant amounts for matching a color (again there being colorant-vector, instead of NPac, metamers at this stage), which is then half-toned colorant-by-colorant and the resulting halftones are then overlaid. Since the color gamut in a non-HANS printing pipeline may contain concavities, the gamut mapping used needs to be suitable for handling concavities. This is because the filtered gamut may be a non-convex subset of the full LUT's gamut. Suitable mapping techniques may include mapping along predetermined lines, for example towards a fixed point on an axis. Once the gamut mapping is performed the process for obtaining a constrained LUT for a non-HANS printing pipeline remains the same as described above for a HANS printing pipeline, i.e. using an interpolation in the interior of the full LUT. Accordingly, the lack of non-convexity for a non-HANS printing pipeline is not an issue because the full LUT is a tessellation of the full gamut, where the gamut mapped colors are in its interior (having been mapped to a subset of the full LUT's gamut that is fully enclosed within).

At least some aspects of the examples described herein with reference to the drawings may be implemented using computer processes operating in processing systems or processors. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes described herein. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

An example of the disclosure provides a tangible and non-transient computer readable medium storing a computer program which when run on a computer causes the computer to implement the creation a color look-up-table for use by an imaging system which uses a resource to display an image and/or provides an attribute of the image, by the blocks of: a) selecting a threshold value of resource usage and/or metric of the attribute by the imaging system; b) accessing a predetermined color look-up-table representing a mapping from color values of a first color gamut to color values displayable by the imaging system, the predetermined color look-up-table having nodes defining colors to be displayed for the said color values; c) comparing resource usage and/or attribute values associated with the said nodes to the threshold value and thereby determining the set of nodes of the predetermined look-up-table having a resource usage and/or attribute value less than the threshold value; and d) creating a further look-up-table which maps the said color values of the first color gamut to the said set of nodes.

Similarly, it should be understood that a controller may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

The preceding description has been presented to illustrate and describe examples of the principles described. This description is not intended to be exhaustive or to limit these principles to any precise form disclosed. Many modifications and variations are possible in light of the above teaching. For example the disclosure may be used to control the power consumption and/or image noise of a display device.

What is claimed is:

1. A non-transitory computer-readable data storage medium storing computer-executable code that a computing device executes to:
   from an original color look-up table for a printing system that has a plurality of nodes mapping color values of a source color gamut to color values of a target color gamut, remove each node having a colorant usage greater than a threshold; and
   generate a replacement node for each removed node within the original color look-up table to generate a replacement color look-up table mapping the color values of the source color gamut to the color values of the target color gamut, the replacement color look-up table having the generated replacement nodes and the nodes of the original color look-up table that the colorant usage of which is not greater than the threshold.

2. The non-transitory computer-readable data storage medium of claim 1, wherein each node of the original color look-up table has a plurality of halftoned patches that map a color value of the source color gamut to a color value of the target color gamut, each halftoned patch having a corresponding colorant usage,
   wherein the computing device is to remove each node that the colorant usage of which is greater than the threshold by removing each node having a halftoned patch that the corresponding colorant usage of which is greater than the threshold,
   and wherein the computing device is to generate the replacement node for each removed node within the original color look-up table by selecting for the replacement node one of the halftoned patches of the removed node that the corresponding colorant usage of which is not greater than the threshold.

3. The non-transitory computer-readable data storage medium of claim 2, wherein the computer-executable code is further executed by the computing device to:
   for each node of the original color look-up table that was not removed, selecting just one of the halftoned patches of the node to include within the replacement color look-up table.

4. The non-transitory computer-readable data storage medium of claim 1, wherein each node of the original color look-up table has a plurality of halftoned patches that map a color value of the source color gamut to a color value of the target color gamut, each halftoned patch having a corresponding colorant usage, wherein the computing device is to remove each node that the colorant usage of which is greater than the threshold by removing each node having a halftoned patch that the corresponding colorant usage of which is greater than the threshold, and wherein the computing device is to generate the replacement node for each removed node within the original color look-up table by interpolating for the replacement node a replacement halftoned patch from the halftoned patches of the removed node, the replacement halftoned patch having a corresponding colorant usage equal to the threshold.

5. The non-transitory computer-readable data storage medium of claim 4, wherein the computer-executable code is further executed by the computing device to:

for each node of the original color look-up table that was not removed, interpolating a replacement halftoned patch from the halftoned patches of the node to include within the replacement color look-up table, the replacement halftoned patch having a corresponding colorant usage equal to the threshold.

6. The non-transitory computer-readable data storage medium of claim 1, wherein the nodes of each of the original color look-up table and the replacement color look-up table are each a convex set of nodes, wherein the computing device is to generate the replacement node for each removed node within the original color look-up table by generating a convex combination of a plurality of neighboring nodes to the removed node within the original color look-up table.

7. The non-transitory computer-readable data storage medium of claim 1, wherein the nodes of each of the original color look-up table and the replacement color look-up table are each a convex set of nodes, wherein the computing device is to generate the replacement node for each removed node within the original color look-up table as a neighboring node to the removed node within the original color look-up table that was not removed.

8. The non-transitory computer-readable data storage medium of claim 1, wherein the printing system is an ink-printing system, and the colorant usage of each node is an ink usage.

9. The non-transitory computer-readable data storage medium of claim 1, wherein the source color gamut is a red-green-blue (RGB) color space, and the target color gamut is a color space comprising cyan, magenta, and yellow.

10. A method comprising:

removing, by a computing device, from an original color look-up table for a printing system having a plurality of nodes that completely map color values of a source gamut to color values of a target color gamut, each node having a colorant usage greater than a threshold, wherein removal of each node of which the colorant usage is greater than the threshold from the original color look-up table resulting in a filtered color look-up table having a plurality of nodes that incompletely map the color values of the source color gamut to the color values of the target color gamut;

determining, by the computing device, a surface of the filtered color look-up table; and applying, by the computing device, a gamut mapping between the original color look-up table and the filtered color look-up table, creating a replacement color look-up table having a plurality of nodes that completely map the color values of the source gamut to the color values of the target color gamut.

11. The method 10, wherein the plurality of nodes of each of the original color look-up table, the filtered color look-up table, and the replacement color look-up table are organized over a plurality of layers from an outer-most layer to an inner-most layer, and wherein removing, from the original color look-up table, each node of which the color usage is greater than the threshold to result in the filtered color look-up table comprises evaluating the nodes starting from the outer-most layer and proceeding on a layer-by-layer basis to the inner-most layer.

12. The method of claim 10, wherein the nodes of each of the original color look-up table and the filtered color look-up table are each a convex set of nodes, and wherein determining the surface of the filtered color table comprises:

generating a replacement node to include within the filtered color table for each removed node within the original color look-up table by generating a convex combination of a plurality of neighboring nodes to the removed node within the original color look-up table.

13. The method of claim 10, wherein the nodes of each of the original color look-up table and the filtered color look-up table are each a convex set of nodes, and wherein determining the surface of the filtered color table comprises:

generating a replacement node to include within the filtered color table for each removed node within the original color look-up table as a neighboring node to the removed node within the original color look-up table that was not removed.

14. The method of claim 10, wherein determining the surface of the filtered color look-up table creates replacement nodes for the nodes that have been removed.

15. The method of claim 14, wherein applying the gamut mapping between the original color look-up table and the filtered color look-up table adds mappings of the color values of the source color gamut to the color values of the target color gamut for the replacement nodes of the filtered color look-up table that each have a colorant usage not greater than the threshold, and wherein the replacement color look-up table is filtered color look-up table after the replacement nodes have been created and after the gamut mapping has been applied.

16. The method of claim 10, wherein the printing system is an ink-printing system, and the colorant usage of each node is an ink usage.

17. The method of claim 10, wherein the source color gamut is a red-green-blue (RGB) color space, and the target color gamut is a color space comprising cyan, magenta, and yellow.

18. A system comprising:

a processor;

a non-transitory computer-readable data storage medium storing computer-executable code that the processor executes to create a replacement color look-up table from an original color look-up table using an intermediary color look-up table, wherein each of the replacement color look-up table, the original color look-up table, and the intermediary look-up table is for a printing system and comprises a plurality of nodes mapping color values of a source color gamut to color values of a target color gamut, wherein the replacement color look-up table completely maps the source color gamut to the target color gamut and each node of the replacement color look-up table has a colorant usage not greater than a threshold, wherein the original color look-up table completely maps the source color gamut to the target color gamut and a node of the original color look-up table has a color usage greater than the threshold, and wherein the intermediary look-up table incompletely maps the source color gamut to the target color gamut and each node of the replacement color look-up table has a colorant usage not greater than the threshold.

19. The system of claim 18, wherein the processor executes the code to generate the intermediary color look-up table as the original look-up table without the nodes that the color usage of which is greater than the threshold.

20. The system of claim 19, wherein the processor executes the code to generate the replacement color look-up table as the intermediary color look-up table with added nodes corresponding to the nodes of the original look-up table that are absent from the intermediary color look-up table but that each have a color usage not greater than the threshold.

* * * * *

UNITED STATES PATENT AND TRADEMARK OFFICE
CERTIFICATE OF CORRECTION

PATENT NO. : 9,674,403 B2
APPLICATION NO. : 15/294622
DATED : June 6, 2017
INVENTOR(S) : Peter Morovic et al.

Page 1 of 1

It is certified that error appears in the above-identified patent and that said Letters Patent is hereby corrected as shown below:

In the Claims

In Column 12, Line 3, in Claim 11, delete "method 10," and insert -- method of claim 10, --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*